United States Patent [19]
Zaiser et al.

[11] 3,893,343
[45] July 8, 1975

[54] CONTROLLABLE AGGREGATE-DRIVE FOR INTERNAL COMBUSTION ENGINES

[75] Inventors: Wolfgang Zaiser, Althutte; Sigurd Hainmuller, Aichschiess, both of Germany

[73] Assignee: Daimler-Benz Aktiengesellschaft, Germany

[22] Filed: Nov. 20, 1973

[21] Appl. No.: 417,576

[30] Foreign Application Priority Data
Nov. 21, 1972 Germany.......................... 2256989

[52] U.S. Cl.................. 74/230.17 F; 74/230.17 A; 74/217 CV; 74/336
[51] Int. Cl......................... F16h 55/52; F16h 5/48
[58] Field of Search............ 74/230.17 R, 230.17 A, 74/230.17 F, 230.17 M, 217 R, 217 CV, 336

[56] References Cited
UNITED STATES PATENTS

| | | | |
|---|---|---|---|
| 2,810,296 | 10/1957 | Long | 74/230.17 F |
| 2,868,027 | 1/1959 | Oberholtz et al. | 74/230.17 F |
| 2,887,893 | 5/1959 | Claas | 74/230.17 F |
| 2,911,961 | 11/1959 | McRae | 74/336 |
| 2,917,937 | 12/1959 | Dodge | 74/336 B |
| 2,962,910 | 12/1960 | Wolfram | 74/336 B |
| 2,964,959 | 12/1960 | Beck et al. | 74/336 B |
| 2,999,574 | 9/1961 | Dodge | 74/336.5 |
| 3,006,208 | 10/1961 | Pokovny | 74/230.17 T |
| 3,269,207 | 8/1966 | Borsattino | 74/230.17 F |
| 3,526,150 | 9/1970 | Iverson | 74/230.17 F |

FOREIGN PATENTS OR APPLICATIONS

| | | | |
|---|---|---|---|
| 668,088 | 8/1963 | Canada | 74/230.17 F |
| 1,907,647 | 10/1970 | Germany | 74/230.17 F |

*Primary Examiner*—Samuel Scott
*Assistant Examiner*—Allan R. Burke
*Attorney, Agent, or Firm*—Craig & Antonelli

[57] ABSTRACT

An aggregate drive for internal combustion engines, especially for motor vehicle internal combustion engines, in which auxiliary aggregates such as the fan can be driven from the crankshaft by means of a controllable V-belt transmission; this V-belt transmission thereby provides a speed-up at low rotational speeds of the crankshaft and automatically reduces the speed-up ratio with increasing rotational speeds of the crankshaft by means of a piston which is associated with the driving pulley of the V-belt transmission and which displaces the movable cone pulley member thereof against spring action; the piston is thereby acted upon directly by the lubricating oil pressure of the internal combustion engine.

30 Claims, 4 Drawing Figures

CONTROLLABLE AGGREGATE-DRIVE FOR INTERNAL COMBUSTION ENGINES

The present invention relates to a controllable aggregate-drive for internal combustion engines, especially for motor vehicle internal combustion engines, whereby the auxiliary aggregates, such as for example, the fan are adapted to be driven from the crankshaft by means of a controllable V-belt transmission, whereby this V-belt control transmission provides at low rotational speeds of the crankshaft a transmission with a speed increase and with increasing crankshaft rotational speeds is adapted to be automatically controlled to reduce the speed increase by means of a piston acted upon by a pressure medium which is coordinated to the driving pulley of the V-belt control transmission and which displaces the loose cone pulley member thereof against spring action.

In a known aggregate-drive of the aforementioned type the adjusting piston is constructed as a ring piston and is acted upon by the centrifugal force which builds up in the annular cylinder space accommodating this ring piston (German Offenlegungsschrift 1,576,358). This arrangement, however, is not quite fully satisfactory because an oil supply from the outside is necessary. It is additionally known in the prior art to utilize for the purpose of control a pressure control system of its own which is fed from a pump rotating with the drive rotational speed (German Patent 1,119,621). This pressure system, however, is located on the outside of the V-belt transmission itself and also engages from the outside on the movable cone pulley member by way of separate plungers by means of rollers. Consequently, this prior art arrangement requires a very large amount of space and additionally necessitates a complete pressure control system of its own.

Accordingly, the present invention is concerned with the task to avoid the described disadvantages. This means, in other words, an aggregate drive is to be provided by the present invention which has a simple construction as well as also a simple operation and by means of which it is possible to achieve the desired control characteristics in an exact and simple manner. The underlying problems are solved according to the present invention in the aforementioned aggregate drives in that the piston is acted upon directly by the lubricating oil pressure of the internal combustion engine.

A surprisingly simple operation and also a surprisingly simple construction of the aggregate drive can be achieved with the proposal of the present invention. It is possible to dispense with any separate pressure control system and above all, with all possibly additionally required influencing magnitudes and consequently with control devices. Nonetheless one obtains a very precise control in dependence on the rotational speed of the internal combustion engine.

In detail it is proposed according to the present invention that the lubricating oil bore of the forward crankshaft main bearing be tapped and be connected by way of a central bore with the space accommodating the adjusting piston. A further proposal of the present invention is to the effect that the adjusting piston is constructed as plunger piston and is arranged in a central space, and in that the adjusting piston is guided torque-resistant with respect to the fixed cone pulley member by means of bolt members uniformly distributed over the circumference. The pressure medium control can be structurally realized in this manner very simple. Additionally, the centrifugal force can also be utilized in this case for the additional control.

In one embodiment according to the present invention the movable cone pulley member is secured at the end face of the plunger piston by means of its hub part and the plunger piston is guided by means of slide bushes or the like on three bolts which are inserted into the fixed cone pulley member. Coil springs are thereby appropriately located adjacent the bolts as return springs which are supported, on the one hand, in a dead-end bore within the hub of the fixed cone pulley member and, on the other hand, in a dead-end bore of a flange at the plunger piston. Of course, in lieu of the coil springs, also other springs may be utilized, possibly also combinations of coil springs.

The inventive concept can be further developed to the effect that additionally a device dependent on torque and possibly also a torsional vibration damper is interconnected into the drive. It is then proposed for that purpose that the driving hub is connected by a sheet metal flange member with a drum portion which accommodates therewithin a conventional torsional vibration damper, at the output of which are arranged three or more inwardly pointing rollers which cooperate with inclined curved surfaces or cams in the plunger piston flange. Finally, this can be further refined according to the present invention in such a manner that the drum portion is rotatably but axially nondisplaceably supported on the fixed cone pulley and the output of the torsional vibration damper is axially supported on the fixed cone pulley.

In another embodiment according to the present invention the plunger piston includes three axially parallel bolts uniformly distributed over the circumference which are guided in corresponding bores of the fixed cone pulley member and are connected with the axially movable cone pulley member. In that connection, it is then additionally proposed that the driving hub is connected by way of a sheet metal flange with a drum portion formed directly externally by the fixed cone pulley member and in that the fixed cone pulley member is connected inwardly thereof with a hollow hub portion which is supported on the axially movable cone pulley member.

Additionally, it is proposed that an abutment for a return spring acting on the axially movable cone pulley member is arranged on the hub part. This return spring, of course, may be constructed as coil spring or as cup spring or plate spring or the like. However, the present invention prefers a solution according to which the return spring constructed as cup or plate spring serves simultaneously for the torque transmission and engages at the inner and outer circumference by means of projections in corresponding apertures provided at the abutment and at the outer circumference of the movable cone pulley member.

In this last-mentioned embodiment the advantage is achieved that so to speak of, a torsional vibration damping results automatically from the arrangement of the cup or plate spring. The aggregate drive therefore becomes more simple from an overall point of view.

The output pulley of the controllable aggregate drive has in principle the same construction whereby, however, the torsional vibration damping or balancing devices can be dispensed with. On the output side, only a return spring is coordinated to the movable cone pulley member which, however, has to be weaker than the return spring on the driving side in order that the latter is able with a decreasing rotational speed, i.e., with a decreasing pressure, to bring back in fact the movable cone pulley member on the drive side and therewith to increase the transmission again to provide a speed-up.

The overall arrangement may take place according to the present invention in such a manner that the drive pulley of the aggregate drive is arranged directly on the crankshaft or in direct proximity thereof and the driven pulley is secured in a separate flange at the internal combustion engine. The torque is then further transmitted to the other aggregates from this drive pulley by way of a multiple V-belt pulley having possibly different diameters. The drive for the fan may thereby be disposed coaxially to the driving pulley of the controllable aggregate drive in order that the fan receives the correct coordination to the radiator. It is proposed in that case according to the present invention to extend the hub portion at the fixed cone pulley member beyond the abutment for the return spring and to support on this extension the fan together with its V-belt pulley.

Accordingly, it is an object of the present invention to provide a controllable aggregate drive for internal combustion engines, especially for motor vehicle internal combustion engines which avoids by simple means the aforementioned shortcomings and drawbacks encountered in the prior art.

Another object of the present invention resides in a controllable aggregate drive for internal combustion engines which require relatively little space and dispenses with the need for a separate pressure control system of its own.

A further object of the present invention resides in an aggregate drive of the type described above which has a construction and operation that are as simple as possible, yet permits the attainment of the desired control characteristics in a very precise and simple manner.

Still a further object of the present invention resides in an aggregate drive for internal combustion engines which is controlled directly by the lubricating oil pressure of the internal combustion engine.

Still another object of the present invention resides in an aggregate drive for internal combustion engines which produces a very accurate control as a function of the rotational speed of the internal combustion engine by the use of a surprisingly simple construction of the drive aggregate, obviating the need of separate pressure control systems and all control devices needed to achieve the required controls.

These and further objects, features and advantages of the present invention will become more apparent from the following description when taken in connection with the accompanying drawing, which shows, for purposes of illustration only, two embodiments in accordance with the present invention, and wherein.

Figure 1A:
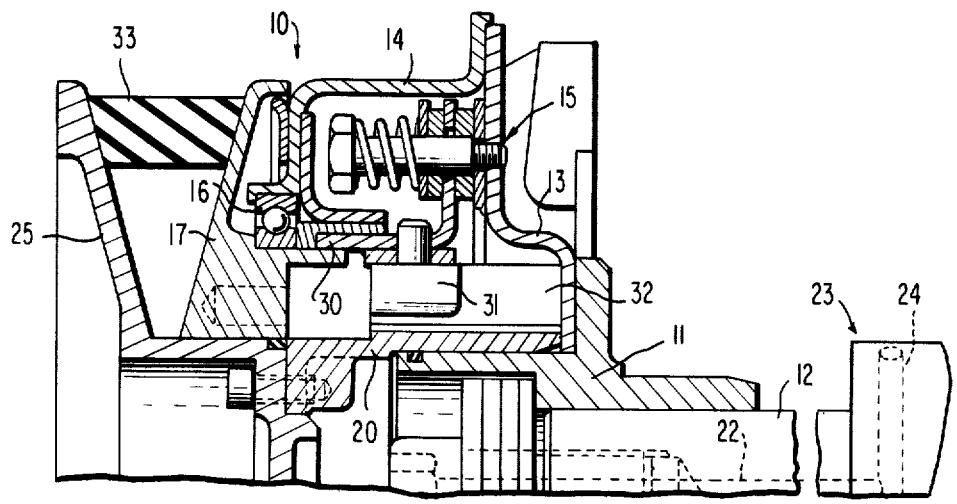
FIGS. 1a and 1b are partial longitudinal axial cross-sectional views through the drive pulley of a first embodiment of a drive aggregate for an internal combustion engine according to the present invention, illustrating in FIG. 1a the position of the V-belt transmission at idling engine speed and in FIG. 1b the position thereof at maximum engine speed.
Figure 1B:
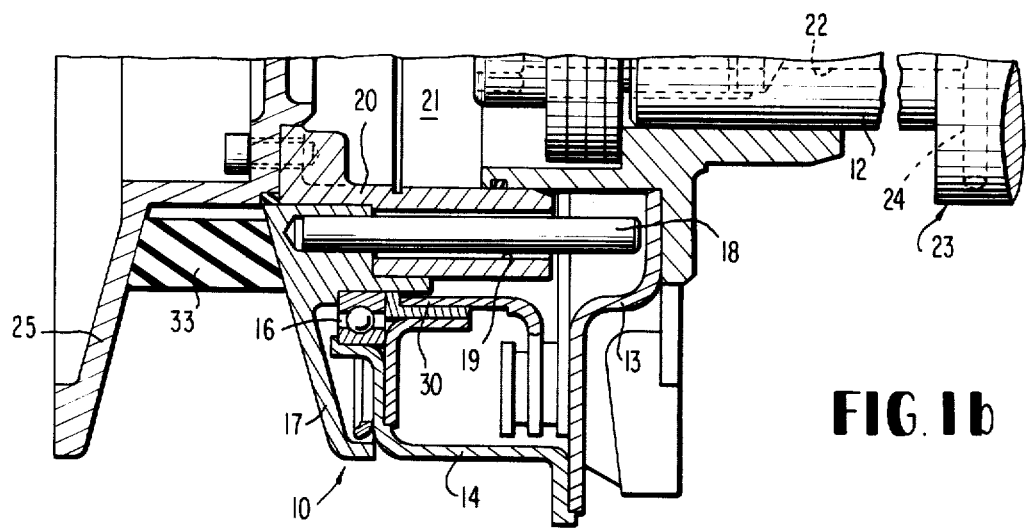

Referring now to the drawing wherein like reference numerals are used throughout the various views to designate like parts, and more particularly to FIGS. 1a and 1b, the drive pulley generally designated by reference numeral 10 of the controllable aggregate drive is arranged according to this figure with the aid of a hub 11 on the forward end of the crankshaft 12. The hub 11 carries by means of a flange portion 13 an outer drum part 14, together with which it forms, so to speak, a housing for a torsional vibration damper or balancer generally designated by reference numeral 15. Additionally, the axially immovable V-belt cone pulley member 17 is arranged in the drum part 14 by means of a bearing 16.

Three bolts 18 are pressed into the hub of the fixed cone pulley member 17, on which a central plunger piston 20 is axially movably arranged by means of self-lubricating slide bushes 19; the plunger piston 20 is sealed off with respect to the hub portion 11. Together with the hub portion 11, the plunger piston 20 forms the pressure space 21 which is adapted to be acted upon with the lubricating medium pressure of the internal combustion engine by way of the central bore 22 from the crankshaft main bearing generally designated by reference numeral 23—whose lubricating bore 24 is tapped. The movable cone pulley member 25 of the V-belt transmission is secured at the forward end of the plunger piston 20. The plunger piston 20 inclusive the movable cone pulley member 25 is therefore axially movable under the influence of the lubricating oil pressure and more particularly against springs 26 (see FIG. 2) which are arranged adjacent the bolts 18. The springs 26 are supported with the forward ends thereof in corresponding apertures or recesses 27 of the hub portion of the fixed cone pulley member 17. At the other end, they are supported at the plunger piston 20 in a dead-end bore 28 of an annular flange 29.

Figure 2:
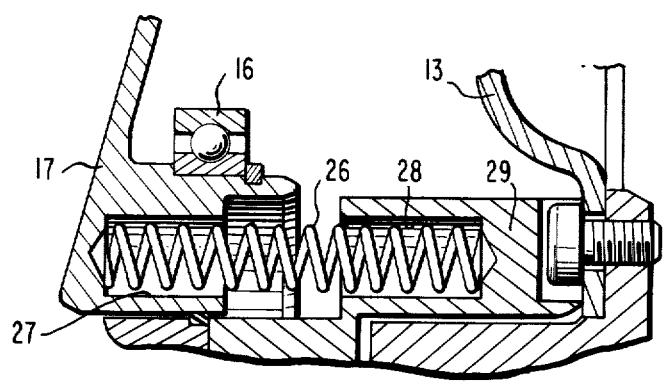
FIG. 2 is a partial cross-sectional view through the spring arrangement in the embodiment according to FIG. 1.

The idling position is thereby illustrated in FIG. 2, i.e., the springs 26 are in their relieved position as is also illustrated, for example, in FIG. 1a.

The torsional vibration damper 15—whose detailed internal construction is of no interest herein since it forms no part of the present invention and may be of any conventional type—carries at its driven sheet metal member 30 three radially inwardly projecting rollers 31 which cooperate with inclined slide surfaces or cams 32 in the annular flange 29 of the plunger piston 20 in such a manner that in all transmission positions of the V-belt, the necessary contact pressure corresponding to every moment results from force decomposition at the rollers 31.

The idling position is illustrated in FIG. 1a and in FIG. 2. Under those circumstances, no lubricating oil pressure is present and the springs 26 hold the movable cone pulley member 25 in the illustrated right end position so that the V-belt 33 is disposed at the upper edge of the entire drive pulley. In this manner, a transmission with a speed-up or speed-increase is achieved. The crankshaft vibrations are damped in a known manner by the torsional vibration damper 15. The springs 26 assume during starting and load-free operation the basic contact pressure of the belt.

If now the internal combustion engine and therewith the drive pulley 10 increases its rotational speed, then the lubricating oil pressure will rise to an increasing extent and finally will adjust the plunger piston 20 against the force of the springs 26 and therewith will adjust the movable cone pulley member 25 ever more toward the left, until it assumes at maximum rotational speed the position illustrated in FIG. 1b. As a result thereof, the belt 33 can pass over from its outer into its inner position. At the driven pulley (not shown) of the control aggregate drive, a spring assures a corresponding reverse operation, i.e., the spring pulls together the driven pulley so that the belt moves outwardly. As a result thereof, the transmission ratio changes to provide a speed reduction. The contact pressure of the movable cone pulley member 25 is thereby assured—as already mentioned—by the axial thrust resulting at the rollers 31 and the slide surfaces 32. With a decreasing rotational speed of the internal combustion engine, the entire operation takes place in a reverse manner.

Figure 3:
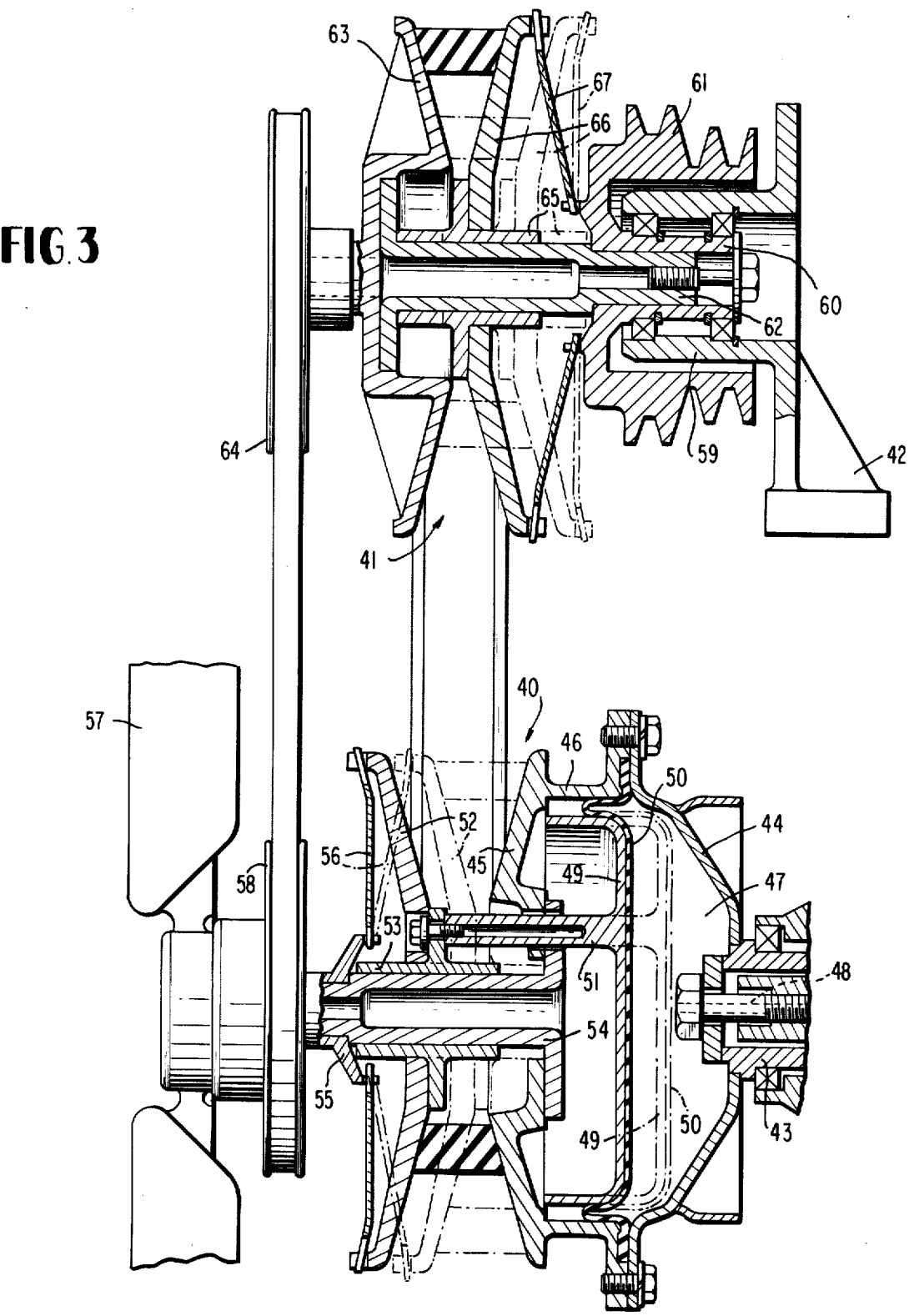
FIG. 3 is a longitudinal axial, cross-sectional view through a modified embodiment of a drive aggregate in accordance with the present invention, illustrating the entire drive unit thereof.

According to FIG. 3, the drive pulley generally designated by reference numeral 40 of the controllable aggregate drive is again operatively connected with the crankshaft of the internal combustion engine whereas the driven pulley generally designated by reference numeral 41 of the controllable aggregate drive is secured at a suitable place of the internal combustion engine by means of a bracket 42. The hub portion 43 of the drive pulley 40 is again connected by means of a sheet metal flange member 44, with a drum portion 46 formed by the fixed cone pulley member 45. A pressure space 47 results therefrom which is again adapted to be acted upon by the lubricating oil pressure of the internal combustion engine by way of a central bore 48.

A piston 49 is disposed in the pressure space 47 formed by the flange member 44 and the fixed cone pulley member 45 together with the drum portion 46 thereof, which is sealed with respect to the space 47 by means of a diaphragm 50. The piston 49 includes three bolt-like parts 51, by means of which it is guided in the fixed cone pulley member 45 and by means of which it is, at the same time, operatively connected with the axially movable cone pulley member 52. The latter is supported with its hub 53 on a hollow hub portion 54 which is operatively connected with the fixed cone pulley member 45 and projects forwardly beyond the pulley 40. An abutment 55 is secured at the end of this hollow hub portion 54 for a cup or plate spring 56 which engages externally thereof at the movable cone pulley member 52 and supplies the return force for the same. In the embodiment described in connection with FIG. 3, the fan 57 together with its V-belt pulley 58 is disposed in front of the abutment 55. The cup spring 56 is also so constructed that it engages into the abutment 55 and into the movable cone pulley member 52 by means of projections so that it can serve simultaneously for the transmission of torque and especially for damping of the torsional vibrations.

At the driven pulley 41, a hollow hub 59 is cast integral with or secured at the bracket 42, in which is supported a hollow shaft 60 which, outwardly thereof is cast integrally directly with the output pulleys 61 or is in operative connection therewith. A shaft 62 is non-rotatably connected with the hollow shaft 60 so as to rotate in unison therewith; the shaft 62 carries at its outer end the fixed cone pulley member 63 as well as a V-belt pulley 64 for the drive of the fan 57. The movable cone pulley member 66 is supported on the shaft 62 by means of a hub portion 65; the pulley member 66 is pre-stressed by a cup spring 67 against the pulley member 63. The cup spring 67, analogous to the arrangement in connection with the drive pulley, is connected outwardly thereof with the movable cone pulley member 66 and inwardly thereof with the hollow shaft 60.

The operation of the arrangement of FIG. 3 is analogously exactly the same as in connection with the embodiment according to FIGS. 1 and 2. The mutually directly opposite parts of FIG. 3 which are located inwardly, so to speak of, provide the idling position and the position at low rotational speeds, i.e., under these conditions a transmission with a speed increase results. The outer parts of FIG. 3 illustrate the position at high rotational speeds of the internal combustion engine with a transmission providing a speed reduction. The other aggregates, i.e., for example, the generator, servo-pump and similar devices are then driven from the V-belt pulley 61 of the driven pulley 41 of the controllable aggregate drive.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A controllable aggregate drive for internal combustion engines having a crankshaft, which comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine without the interposition of any control means for controlling the lubricating oil pressure.

2. An aggregate drive according to claim 1, characterized in that the auxiliary aggregate includes a cooling fan.

3. An aggregate drive in which the crankshaft is supported by a forward crankshaft main bearing having a lubricating oil bore according to claim 1, characterized in that the lubricating oil bore of the forward crankshaft main bearing is tapped and is operatively connected by way of a central bore with the space accommodating the adjusting piston means.

4. An aggregate drive with a fixed pulley member according to claim 3, characterized in that the piston means is constructed as plunger piston and is arranged in a central space, and in that the piston means is guided torque-resistant with respect to the relatively fixed pulley member by means of several bolt members substantially uniformly distributed over the circumference.

5. An aggregate drive according to claim 4, characterized in that the movable pulley member is secured with its hub portion at the end face of the piston means and in that the piston means is guided on several bolt members by slide means, said bolt members being secured in the fixed pulley member.

6. A controllable aggregate drive for internal combustion engines having a crankshaft supported by a forward crankshaft main bearing having a lubricating oil bore, which comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, the lubricating oil bore of the forward crankshaft main bearing is tapped and is operatively connected by way of a central bore with the space accommodating the adjusting piston means, the piston means is constructed as a plunger piston and is arranged in a central space, and in that the piston means is guided torque-resistant with respect to the relatively fixed pulley member by means of several bolt members substantially uniformly distributed over the circumference, the movable pulley member is secured with its hub portion at the end face of the piston means and in that the piston means is guided on several bolt members by slide means, said bolt members being secured in the fixed pulley member, and in that said slide means are slide bushes, the piston means being guided by said slide bushes on three bolt members.

7. An aggregate drive according to claim 5, characterized in that coil springs are arranged adjacent the bolt members as return springs which are supported, on the one hand, in dead-end bore means provided in the hub portion of the relatively fixed pulley member and, on the other, in a dead-end bore means of a flange portion at the piston means.

8. An aggregate drive according to claim 7, characterized in that a torque-dependent means is interconnected into the drive.

9. A controllable aggregate drive for internal combustion engines having a crankshaft supported by a forward crankshaft main bearing having a lubricating oil bore, which aggregate drive comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, the lubricating oil bore of the forward crankshaft main bearing is tapped and is operatively connected by way of a central bore with a central space accommodating the piston means, the piston means is constructed as a plunger piston and is arranged in the central space, the piston means is guided torque-resistant with respect to the relatively fixed pulley member by means of several bolt members substantially uniformly distributed over the circumference, the movable pulley member is secured with its hub portion at the end face of the piston means, the piston means is guided on several bolt members by slide means, said bolt members being secured in the fixed pulley member, coil springs are arranged adjacent the bolt members as return springs which are supported, on the one hand, in dead-end bore means provided in the hub portion of the relatively fixed pulley member and, on the other, in a dead-end bore means of a flange portion at the piston means, a torque-dependent means is interconnected into the aggregate drive, and in that additionally a torsion vibration damping means is interconnected into the aggregate drive.

10. A controllable aggregate drive for internal combustion engines having a crankshaft supported by a forward crankshaft main bearing having a lubricating oil bore, which aggregate drive comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, the lubricating oil bore of the forward crankshaft main bearing is tapped and is operatively connected by way of a central bore with a central space accommodating the adjusting piston means, the piston means is constructed as a plunger piston and is arranged in the central space, the piston means is guided torque-resistant with respect to the relatively fixed pulley member by means of several bolt members substantially uniformly distributed over the circumference, the movable pulley member is secured with its hub portion at the end face of the piston means and the piston means is guided on several bolt members by slide means, said bolt members being secured in the fixed pulley member, coil springs are arranged adjacent the bolt members as return springs which are supported, on the one hand, in dead-end bore means provided in the hub portion of the relatively fixed pulley member and, on the other, in a dead-end bore means of a flange portion at the piston means, and in that the driving hub portion is connected with a drum portion by way of a flange member, said drum portion accommodating therein a torsional vibration damper means, at the output of which are arranged several inwardly projecting roller means which cooperate with inclined curved surface means provided in the piston flange portion.

11. An aggregate drive according to claim 10, characterized in that three roller means are arranged at the output of the torsional vibration damping means.

12. An aggregate drive according to claim 10, characterized in that the drum portion is rotatably but axially non-displaceably supported on the fixed pulley member and the output of the torsional vibration damping means is axially supported on the fixed pulley member.

13. An aggregate drive according to claim 4, characterized in that the piston means includes three axially parallel bolt members distributed substantially uniformly over the circumference which are guided in corresponding bores of the fixed pulley member and are operatively connected with the axially movable pulley member.

14. A controllable aggregate drive for internal combustion engines having a crankshaft supported by a forward crankshaft main bearing having a lubricating oil bore, which aggregate drive comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ration is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, the lubricating oil bore of the forward crankshaft main bearing is tapped and is operatively connected by way of a central bore with a central space accommodating the piston means, the piston means is constructed as a plunger piston and is arranged in the central space, the piston means is guided torque-resistant with respect to the relatively fixed pulley member by means of several bolt members substantially uniformly distributed over the circumference, the piston means includes three axially parallel bolt members distributed substantially uniformly over the circumference which are guided in corresponding bores of the fixed pulley member and are operatively connected with the axially movable pulley member, and in that the driving hub portion is connected by a flange member with a drum portion formed directly by the fixed pulley member and in that the fixed pulley member is connected inwardly thereof with a hollow hub portion on which is supported the axially movable pulley member.

15. An aggregate drive according to claim 14, characterized in that an abutment means for a return spring acting on the axially movable pulley member is arranged on the hollow hub portion.

16. An aggregate drive according to claim 15, characterized in that the return spring constructed as cup spring serves simultaneously for the transmission of torque and engages at the inner and outer circumference by means of projections in corresponding apertures at the abutment means and at the outer circumference of the movable pulley member.

17. An aggregate drive with a fixed pulley member according to claim 1, characterized in that the piston means is constructed as plunger piston and is arranged in a central space, and in that the piston means is guided torque-resistant with respect to the relatively fixed pulley member by means of several bolt members substantially uniformly distributed over the circumference.

18. An aggregate drive with a fixed pulley member according to claim 1, characterized in that the movable pulley member is secured with its hub portion at the end face of the piston means and in that the piston means is guided on several bolt members by slide means, said bolt members being secured in the fixed pulley member.

19. An aggregate drive according to claim 18, characterized in that said slide means are slide bushes, the piston means being guided by said slide bushes on three bolt members.

20. An aggregate drive according to claim 18, characterized in that coil springs are arranged adjacent the bolt members as return springs which are supported, on the one hand, in dead-end bore means provided in the hub portion of the relatively fixed pulley member and, on the other, in a dead-end bore means of a flange portion at the piston means.

21. An aggregate drive according to claim 1, characterized in that a torque-dependent means is interconnected into the drive.

22. A controllable aggregate drive for internal combustion engines having a crankshaft, which comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, and in that additionally a torsion vibration damping means is interconnected into the aggregate drive.

23. A controllable aggregate drive for internal combustion engines having a crankshaft, which comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, and in that a driving hub portion is connected with a drum portion by way of a flange member, said drum portion accommodating therein a torsional vibration damper means, at the output of which are arranged several inwardly projecting roller means which cooperate with inclined curved surface means provided in the piston flange portion.

24. An aggregate drive according to claim 23, characterized in that three roller means are arranged at the output of the torsional vibration damping means.

25. An aggregate drive according to claim 23, characterized in that the drum portion is rotatably but axially non-displaceably supported on the fixed pulley member and the output of the torsional vibration damping means is axially supported on the fixed pulley member.

26. An aggregate drive with a fixed pulley member according to claim 1, characterized in that the piston means includes three axially parallel bolt members distributed substantially uniformly over the circumference which are guided in corresponding bores of the fixed pulley member and are operatively connected with the axially movable pulley member.

27. A controllable aggregate drive with a fixed pulley member for internal combustion engines having a crankshaft which comprises a controllable V-belt transmission means for driving at least one auxiliary aggregate from said crankshaft including a driving pulley means having a movable pulley member, and means controlling the transmission ratio of said V-belt transmission means in such a manner that at low rotational speeds of the crankshaft a transmission with a speed increase results and with increasing rotational speeds of the crankshaft the speed increase transmission ratio is automatically reduced, including a piston means acted upon by a pressure medium, said piston means being operatively connected with the driving pulley means of the V-belt transmission means and displacing against spring action the movable pulley member thereof, characterized in that the piston means is acted upon directly by the lubricating oil pressure of the internal combustion engine, and in that the driving hub portion is connected by a flange member with a drum portion formed directly by the fixed pulley member and in that the fixed pulley member is connected inwardly thereof with a hollow hub portion on which is supported the axially movable pulley member.

28. An aggregate drive according to claim 27, characterized in that an abutment means for a return spring acting on the axially movable pulley member is arranged on the hollow hub portion.

29. An aggregate drive according to claim 28, characterized in that the return spring constructed as cup spring serves simultaneously for the transmission of torque and engages at the inner and outer circumference by means of projections in corresponding apertures at the abutment means and at the outer circumference of the movable pulley member.

30. A controllable aggregate drive for an internal combustion engine having a lubricating oil system communicating with a lubricating bore means provided in a crankshaft, the aggregate drive comprising: transmission means for driving at least one auxiliary aggregate from the crankshaft including a driving pulley means and a movable pulley means; and means for controlling the transmission ratio of said transmission means including a pressure space means, a piston means connected with said driving pulley means disposed in said pressure space means, and means for permitting direct and substantially uninterrupted communication between the lubricating bore means in the crankshaft and said pressure space means whereby said piston means is acted upon directly by the lubricating oil pressure, which lubricating oil pressure reflects the actual rotational speed of the internal combustion engine.

* * * * *